(12) United States Patent
Sumi

(10) Patent No.: US 7,543,950 B2
(45) Date of Patent: Jun. 9, 2009

(54) DIFFUSE REFLECTOR FOR A LIQUID CRYSTAL DISPLAY DEVICE

(75) Inventor: Naoki Sumi, Kobe (JP)

(73) Assignee: TPO Hong Kong Holding Limited, Shatin (HK)

( * ) Notice: Subject to any disclaimer, the term of this patent is extended or adjusted under 35 U.S.C. 154(b) by 155 days.

(21) Appl. No.: 10/497,261

(22) PCT Filed: Nov. 26, 2002

(86) PCT No.: PCT/IB02/04997

§ 371 (c)(1),
(2), (4) Date: May 27, 2004

(87) PCT Pub. No.: WO03/046650

PCT Pub. Date: Jun. 5, 2003

(65) Prior Publication Data

US 2005/0105020 A1 May 19, 2005

(30) Foreign Application Priority Data

Nov. 29, 2001 (JP) .............................. 2001-365388

(51) Int. Cl.
G02B 5/08 (2006.01)
(52) U.S. Cl. .................... 359/883; 359/900; 349/113
(58) Field of Classification Search ............... 349/113
See application file for complete search history.

(56) References Cited

U.S. PATENT DOCUMENTS

| 5,936,688 | A | 8/1999 | Tsuda et al. | |
|---|---|---|---|---|
| 6,522,375 | B1 * | 2/2003 | Jang et al. | 349/113 |
| 6,781,759 | B1 * | 8/2004 | Wakita et al. | 359/599 |
| 2001/0013913 | A1 * | 8/2001 | Young | 349/113 |
| 2002/0075432 | A1 * | 6/2002 | Yamaguchi et al. | 349/113 |
| 2002/0093604 | A1 * | 7/2002 | Shinjo | 349/67 |

FOREIGN PATENT DOCUMENTS

| EP | 0 084 930 | | 8/1983 |
|---|---|---|---|
| EP | 0 495 679 | A2 | 7/1992 |
| EP | 0 549 890 | A | 7/1993 |
| EP | 0 965 863 | A2 | 12/1999 |
| JP | 4-243226 | A | 8/1992 |
| JP | 6-167708 | A | 6/1994 |

(Continued)

OTHER PUBLICATIONS

Patent Abstracts Of Japan vol. 2000, No. 4, 31 Aug. 2000 & JP 2000 029021 (Sharp Corporation) Jan. 28, 2000, Abstract; Figure 5.

*Primary Examiner*—Stephone B. Allen
*Assistant Examiner*—Derek S Chapel
(74) *Attorney, Agent, or Firm*—Birch, Stewart, Kolasch & Birch, LLP

(57) ABSTRACT

A method of forming a reflector member which contributes to an improvement of the quality of the image, and a reflective structure and a liquid crystal display device to which the method is applied. The plurality of holes are formed by exposing the first photosensitive film to light and developing it. A second photosensitive film is formed on the first photosensitive film in which the plurality of holes have been formed. The reflective electrode is formed on the second photosensitive film.

7 Claims, 14 Drawing Sheets

FOREIGN PATENT DOCUMENTS

| | | |
|---|---|---|
| JP | 8-227071 A | 9/1996 |
| JP | 2000-187208 A | 7/2000 |
| JP | 2000-292785 A | 10/2000 |
| JP | 2000-292785 A * | 10/2000 |
| JP | 2000 292785 A | 2/2001 |
| WO | WO 0129585 A1 * | 4/2001 |
| WO | WO-02/052337 A1 | 7/2002 |

* cited by examiner

DIFFUSE REFLECTOR FOR A LIQUID CRYSTAL DISPLAY DEVICE

BACKGROUND OF THE INVENTION

1. Field of the Invention

The invention relates to a method of forming a reflector member, to a reflective structure, and to liquid crystal display device.

2. Description of Related Art

In a liquid crystal display device comprising a reflective electrode or a reflector, such as a liquid crystal display device of reflective type, the reflective electrode or the reflector is often provided with recesses or projections in order to improve the quality of the image to be displayed. In order to provide the reflective electrode or the reflector with recesses or projections, photosensitive resin is applied and the applied photosensitive resin is patterned in a predetermined form before forming the reflective electrode or the reflector.

It is possible to provide the reflective electrode or the reflector with recesses or projections by patterning the photosensitive resin in the predetermined form, but if the photosensitive resin is simply patterned it is difficult to improve the quality of the image to be displayed by the liquid crystal display device.

It is an object of the invention to provide a method of forming a reflector member which contributes to an improvement of the quality of the image, and a reflective structure and a liquid crystal display device to which the method is applied.

SUMMARY OF THE INVENTION

A method of forming a reflector member according to the present invention for achieving the object comprises a step of forming an underlayer and a step of forming the reflector member on the underlayer, the method according to the invention is characterized in that the step of forming the underlayer comprises the steps of:

forming a first film;

forming a plurality of holes in the first film; and forming a second film on the first film in which the plurality holes have been formed;

wherein the step of forming the plurality of holes is a step of forming the plurality of holes in the first film in such a way that a plurality of partitions are formed in the first film, each of the plurality of partitions having a substantially constant width and separating adjacent holes of the plurality of holes; and wherein the widths of at least several of the plurality of partitions are substantially equal to each other.

In a method of forming a reflector member according to the invention, the first film is formed and the plurality of holes are formed in the first film in order to form the underlayer. The plurality of holes are formed in the first film in such a way that the plurality of partitions are formed in the first film. Each of the plurality of partitions has a substantially constant width and separates adjacent holes of the plurality of holes. Further, the widths of at least several of the plurality of partitions are substantially equal to each other. Since the underlayer is provided with the first film having the partitions, a shape of the reflector member formed on the underlayer is influenced by shapes of the partitions, so that an adjustment of size etc. of the partitions makes it possible to adjust a reflection direction of light reflected by the reflective member. Therefore, if the reflective member is applied to a liquid crystal display device for example, it is possible to improve a quality of image displayed by the liquid crystal display.

In a method of forming a reflector member according to the present invention, it is preferable that the widths of the at lease several of the plurality of partitions are in the range from 3 μm to 6 μm inclusive. By setting the width of the partitions in the range described above, it is easily possible to adjust a reflection direction of light reflected by the reflective member.

In a method of forming a reflector member according to the present invention, it is preferable that, in the step of forming a plurality of holes, the plurality of holes are formed in the first film in such a way that a plurality of hole sets are formed in the first film, wherein each of the hole sets comprises one first hole and at least three second holes of the plurality of holes; and wherein the at least three second holes are arranged around the first hole. By forming the plurality of hole sets, a number of holes can be formed in the first film at high density. By forming the number of holes in the first film, it is possible to decrease a specular reflection component of light reflected by the reflector member.

In a method of forming a reflector member according to the present invention, it is preferable that the number of the second holes is seven. If a liquid crystal display device is provided with the reflector member in this method, it is possible to prevent an interference of light reflected by the reflector member of the liquid crystal display device effectively.

In a method of forming a reflector member according to the present invention, it is preferable that the step of forming the first film is a step of forming a photosensitive film, and that the step of forming the plurality of holes is a step of patterning the photosensitive film in such a way that the plurality of partitions are formed in the photosensitive film, each of the plurality of holes having a substantially constant width and separating adjacent holes of the plurality of holes, wherein the widths of at lease several of the plurality of partitions are substantially equal to each other. If the photosensitive film is formed as the first film and the photosensitive film is patterned, it is easily possible to provide the photosensitive film with the partitions.

A reflective structure according to the invention comprises a plurality of reflector members and an underlayer for providing the reflector members with predetermined forms, the reflective structure according to the invention is characterized in that the underlayer comprises a first film having a plurality of holes and a second film formed on the first film, in that at least portion of each of at least several of the plurality of holes is filled with a material of the second film, in that the first film comprises a plurality of partitions, each of the plurality of partitions having a substantially constant width and separating adjacent holes of the plurality of holes, and in that the widths of at least several of the plurality of partitions are substantially equal to each other.

In a reflective structure according to the invention, it is also preferable that the widths of the at least several of the plurality of partitions are in the range from 3 μm to 6 μm inclusive.

In a reflective structure according to the invention, it is preferable that the plurality of holes are formed in the first film in such a way that a plurality of hole sets are formed in the first film, wherein each of the hole sets comprises one first hole and at least three second holes of the plurality of holes, and wherein the at least three second holes are arranged around the first hole.

In a reflective structure according to the invention, it is preferable that the number of the second holes is seven.

In a reflective structure according to the invention, it is preferable that the first and second films are formed from a photosensitive resin.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT(S)

Hereinafter, an embodiment of the present invention will be described.

Figure 1:
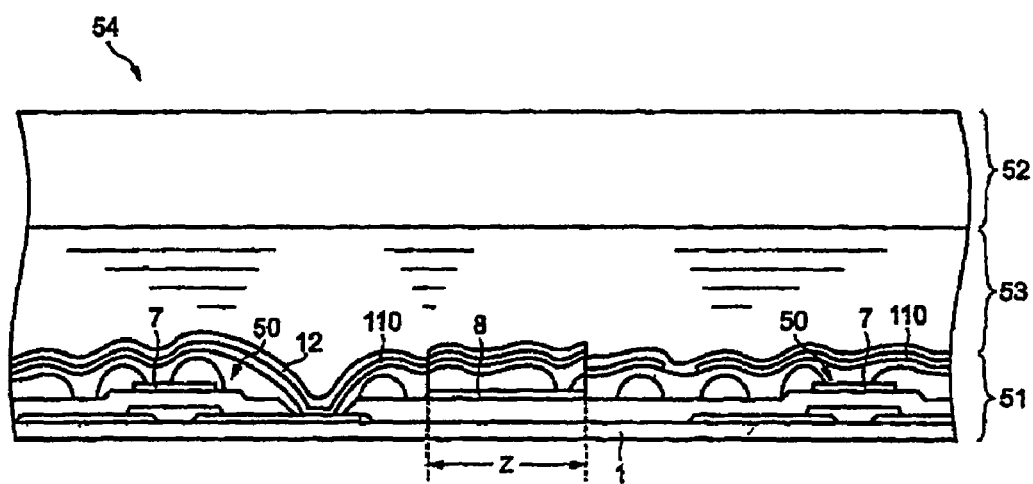
FIG. 1 is a partial cross-sectional view of the liquid crystal display device comprising a reflective electrode which has been formed using one example of a method of forming an reflector according to the present invention.

FIG. 1 is a partial cross-sectional view of the liquid crystal display device comprising a reflective electrode which has been formed using one example of a method of forming an reflector according to the present invention. In this embodiment, it will be described that a reflective electrode provided in a liquid crystal display device is formed using a method of forming a reflector according to the present invention, but it is noted that a reflective electrode provided in a device other than a liquid crystal display device can be formed using a method of forming a reflector according to the present invention.

The liquid crystal display device 54 comprises a TFT substrate assembly 51 (which is one example of the reflector structure according to the present invention) having a TFT 50, a reflective electrode (which is one example of the reflector according to the present invention) 110 and others. An alignment layer 12 is formed on the TFT substrate assembly 51. The liquid crystal display device 54 comprises a colour filter substrate assembly 52 having a colour filter and others. The structure of the colour filter substrate assembly 52 is shown simply in FIG. 1 since the substrate assembly 52 is irrelevant to the characteristic part of this embodiment. A liquid crystal layer 53 is provided between the TFT substrate assembly 51 and the colour filter substrate assembly 52. It is noted that a region Z of the TFT substrate assembly 51 shown in FIG. 1 corresponds to regions Z shown in FIG. 2 to FIG. 6, FIG. 12, FIG. 14, FIG. 15 and FIG. 16 described later.

Hereinafter, a method of manufacturing the TFT substrate assembly 51 having a reflective electrode 110 which is characteristic part in this embodiment will be described.

Figure 2:
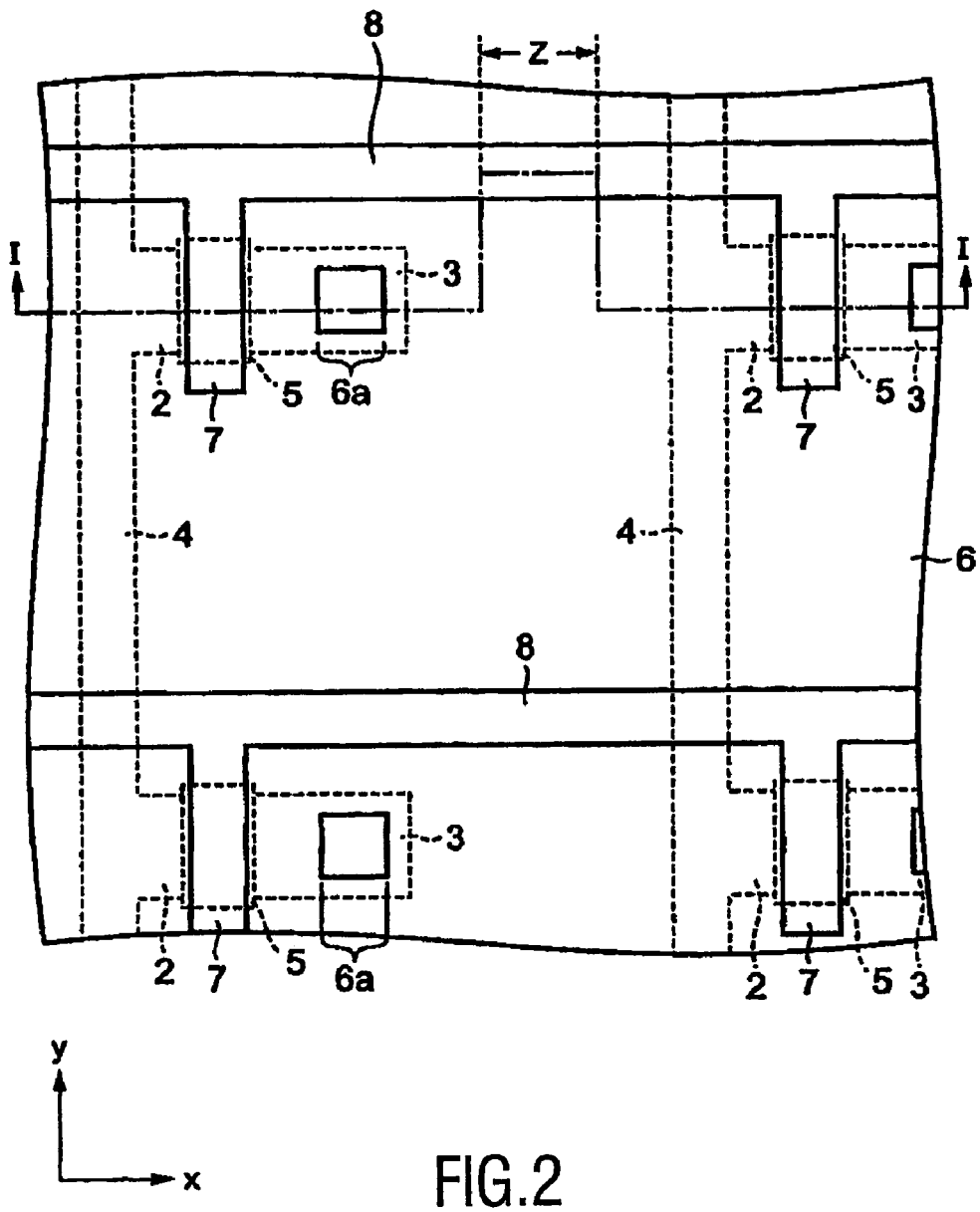
FIG. 2 is a plan view of a glass substrate 1 just after a gate electrode 7 and a gate bus 8 have been formed.
Figure 3:
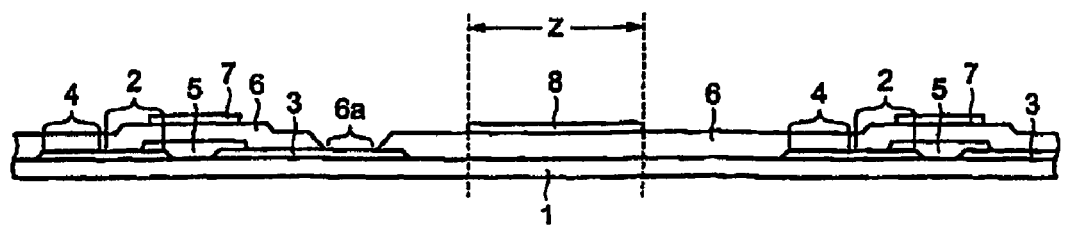
FIG. 3 is a cross-sectional view of the substrate 1 taken along line I-I of FIG. 2.

FIG. 2 is a plan view of a part of a glass substrate 1 just after a gate electrode 7 and a gate bus 8 have been formed. FIG. 3 is a cross-sectional view of the substrate 1 taken along line I-I of FIG. 2.

As shown in FIGS. 2 and 3, a source electrode 2, a drain electrode 3, a source bus 4, a semiconductor layer 5 (for example, a-Si), a gate insulating film 6 a gate electrode 7 and a gate bus 8 are formed on the glass substrate 1. As shown in FIG. 2, the source bus 4 is formed so as to extend in the y direction and the gate bus 8 is formed so as to extend in the x direction. In the gate insulating film 6, a rectangular window 6a for exposing a part of the drain electrode 3 is formed. After the gate electrode 7 and the gate bus 8 are formed, a photosensitive film will be formed (see FIG. 4).

Figure 4:
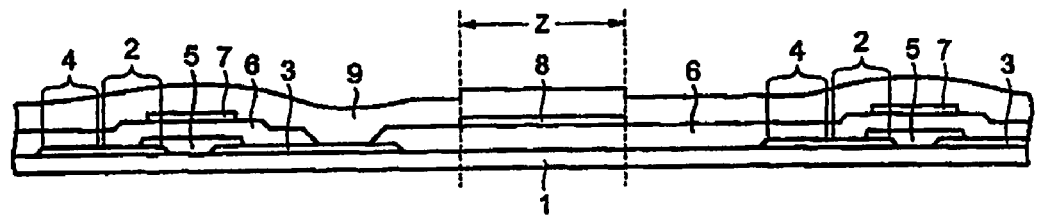
FIG. 4 is a cross-sectional view of the substrate on which the photosensitive film has been formed.

FIG. 4 is a cross-sectional view of the substrate on which the photosensitive film has been formed.

The photosensitive film (which corresponds to "first film" according to the present invention) 9 can be formed by applying a photosensitive resin in a spin coating method and pre-baking the applied photosensitive resin. After the photosensitive film 9 is formed, the photosensitive film 9 is patterned by exposing the film 9 to light, developing the exposed film 9 and postbaking the developed film 9 (see FIG. 5 and FIG. 6).

Figure 5:
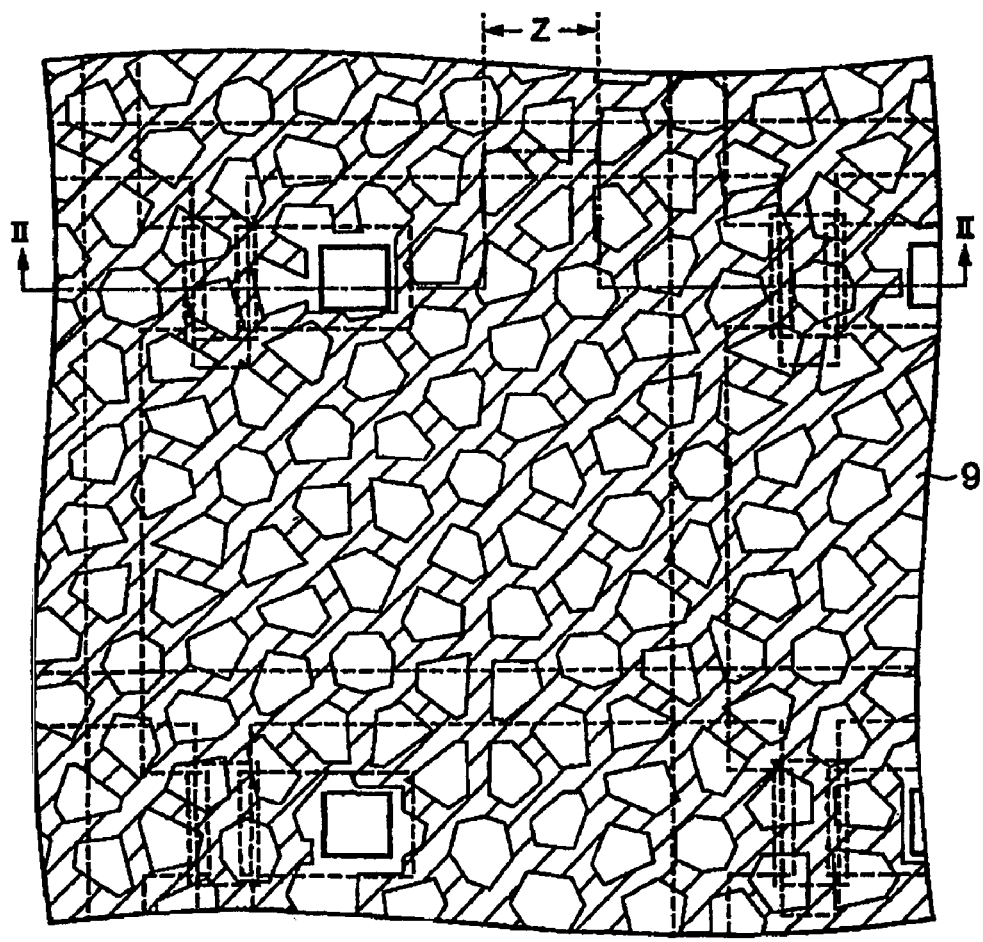
FIG. 5 is a plan view of the substrate having the photosensitive film 9 which has been patterned.
Figure 6:
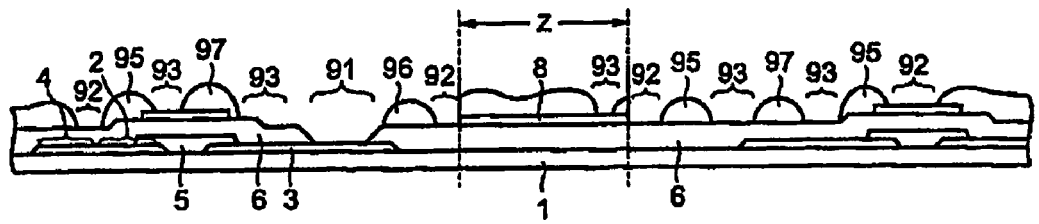
FIG. 6 is a cross-sectional view of the substrate taken along line II-II of FIG. 2.

FIG. 5 is a plan view of the substrate having the photosensitive film 9 which has been patterned. FIG. 6 is a cross-sectional view of the substrate taken along line II-II of FIG. 2.

In this embodiment, as shown in FIG. 6, the photosensitive film 9 is patterned so as to form not only holes 91 but also a number of holes 92 and 93 in the photosensitive film 9. In FIG. 5, a portion of the photosensitive film 9 which has not been removed (i.e. remainder of the photosensitive film 9) is shown by hatching and the holes 92 and 93 formed in the photosensitive film 9 are shown by non-hatched polygons. The photosensitive film 9 is patterned in a mesh form by forming the holes 92 and 93 in the photosensitive film 9. The holes 92 and 93 are formed in accordance with a predetermined rule. Hereinafter, the predetermined rule is described with reference to FIGS. 7 to 10.

Figure 7:
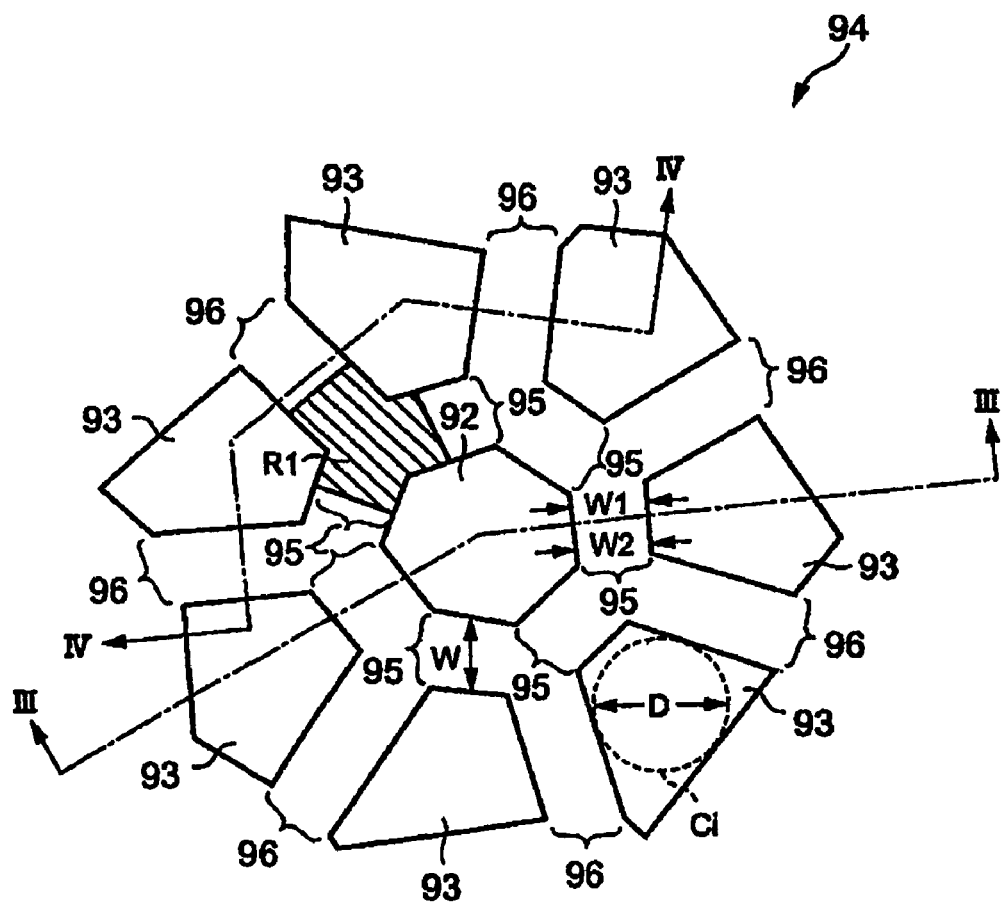
FIG. 7 is a plan view of several holes 92 and 93 formed in the photosensitive film 9.
Figure 8:
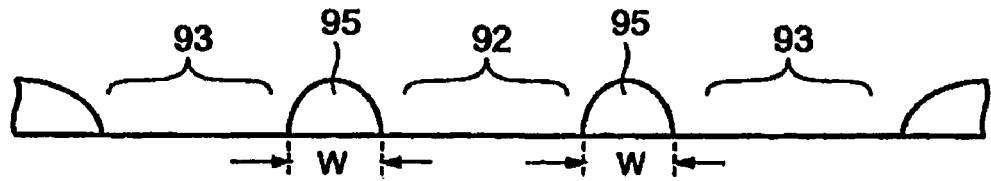
FIG. 8 is a cross-sectional view of the holes taken along line III-III of FIG. 7.
Figure 9:
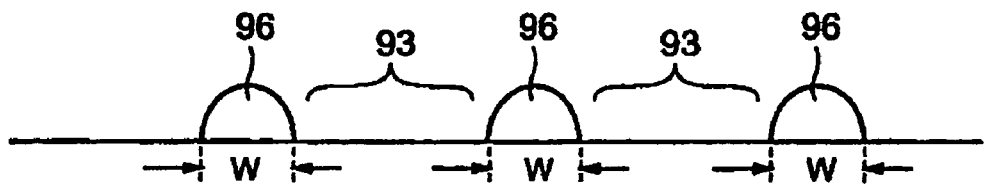
FIG. 9 is a cross-sectional view of the holes taken along line IV-IV of FIG. 7.

FIG. 7 is a plan view of several holes 92 and 93 formed in the photosensitive film 9. FIG. 8 is a cross-sectional view of the holes taken along line III-III of FIG. 7. FIG. 9 is a cross-sectional view of the holes taken along line IV-IV of FIG. 7. In FIG. 7, the electrodes and others which have been formed below the photosensitive film 9 are omitted and the holes 92 and 93 are only shown.

As shown in FIG. 7, seven holes 93 are arranged around one hole 92. By this one hole 92 and seven holes 93, one hole set 94 consisting of eight holes is structured. In this embodiment, a plurality of hole sets 94 each having the structure shown in FIG. 7 are formed in the photosensitive film 9 (see FIG. 10).

Figure 10:
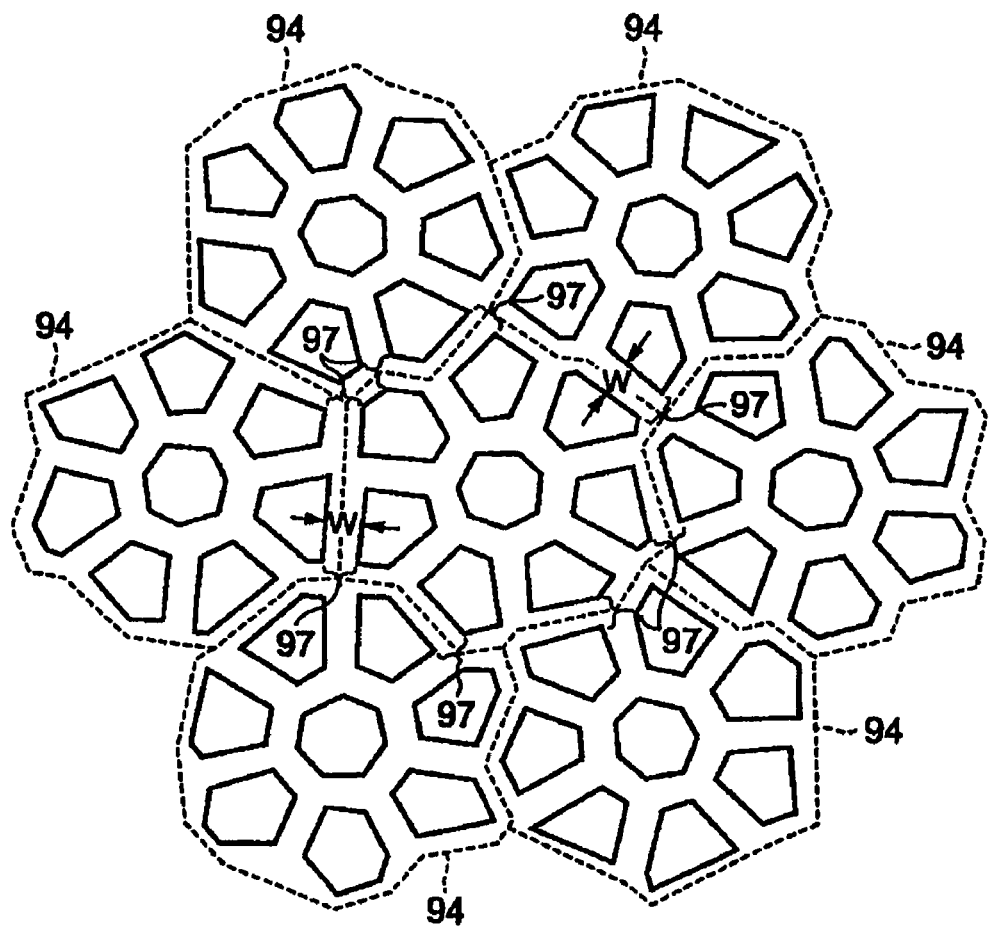
FIG. 10 is a plan view of the plurality of hole sets 94.

FIG. 10 is a plan view of the plurality of hole sets 94.

Each of the hole sets 94 (which is surrounded by broken line) is formed so as to be surrounded by six hole sets 94. In FIG. 10, for the sake of convenience of explanation, only seven hole sets 94 are shown and only one hole set 94 of the shown seven hole sets 94 which is located at the center is surrounded by six hole sets 94. However, it is noted that each of the other hole sets 94 is also surrounded by six hole sets. In this way, in this embodiment, the hole sets 94 having the structure shown in FIG. 7 are formed in the photosensitive film 9 so as to be surrounded by six hole sets 94.

The explanation will be continued returning to FIG. 7.

In this embodiment, the holes 92 and 93 are formed in such a way that partitions 95 for each separating the hole 92 from each of the seven holes 93 remain between the hole 92 and the seven holes 93 and partitions 96 for each separating adjacent two holes 93 remain between the adjacent two holes 93. The partitions 95 and 96 are not separated from each other but formed so as to be continuous. Therefore, the hole 92 is surrounded by seven partitions 95 which are continuous. Here, when one of partitions 95 is considered, there is a relationship of W1=W2 between a width W1 of the considered one partition 95 at a certain portion and a width W2 of the considered one partition 95 at another portion. In FIG. 7, the symbols W1 and W2 are illustrated at the only one portion 95 of the continuous seven portions 95, but it is noted that the other portions 95 also have the relation of W1=W2=W. That is to say, a width of each of the portions 95 does not vary depending on the portions of the partition 95 but has a substantially constant width W.

The partitions 96 remaining between the adjacent two holes 93 also have a substantially constant width W just as with the case of the partitions 95. In this embodiment, the value of width W is approximately 4 μm. Further, in this embodiment, the photosensitive film 9 is patterned in such a way that the diameter D of the inscribed circle Ci of each of the holes 92 and 93 have approximately 5 μm (in FIG. 7, the inscribed circle Ci of only one hole 93 is shown).

Further, as shown in FIG. 10, partitions 97 are provided between the adjacent two hole sets 94. The adjacent hole sets 94 are thus separated by the partition 97. The partitions 97 has a substantially constant width W (approximately 4 μm) as the partitions 95 and 96 (see FIG. 7).

In FIGS. 5 to 10, the example where seven holes 93 are provided around the hole 92 in each hole set 94 is shown, but the number of the holes 93 provided around the hole 92 is not limited to seven. Hereinafter, the example where the number of holes 93 provided around the hole 92 is not seven will be described with reference to FIG. 11.

Figure 11:
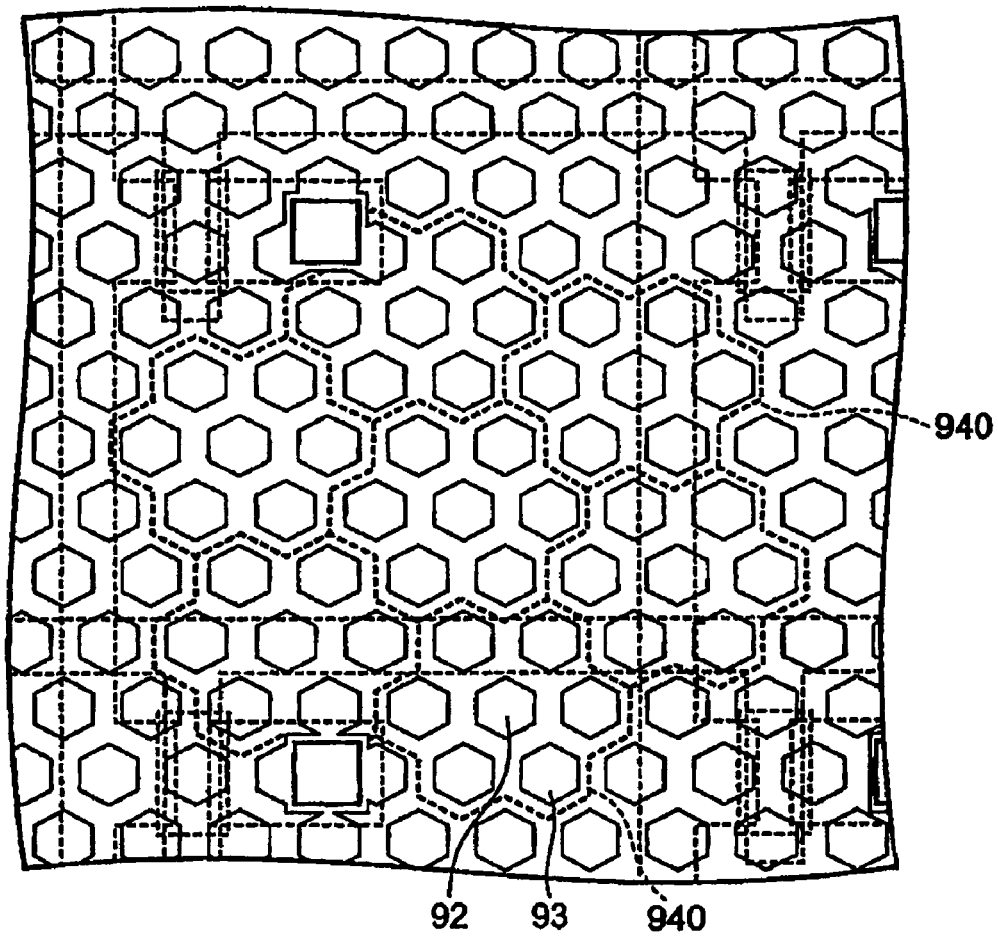
FIG. 11 is a plan view of six holes 93 provided around the hole 92.

FIG. 11 is a plan view of six holes 93 provided around the hole 92.

In FIG. 11, just as in the case of FIGS. 5 to 8, a plurality of hole sets 940 are provided and each of the hole sets 940 is surrounded by six hole sets 940. However, in FIG. 11, the hole set 940 is provided with one hole 92 and six holes 93 which are arranged so as to surround the hole 92. As shown in FIG. 11, the number of the holes 93 provided around the hole 92 is not limited to seven. It is noted that the number of the holes 93 may be larger than seven or smaller than six. However, in the following description of this embodiment, seven holes 93 are provided around one hole 92. In the case that seven holes 93 are provided, it is advantage that an interference of light which occurs in the liquid crystal display device can be prevented efficiently as compared with the case that six holes 93 are provided.

By patterning the photosensitive film 9 in such a way that the holes 91, 92 and 93 are formed, the partitions 95, 96 and 97 which are continuous in the mesh form are formed from the photosensitive film 9. After forming the holes 91, 92 and 93 in the photosensitive film 9, a further photosensitive film 10 is formed (see FIG. 12).

Figure 12:
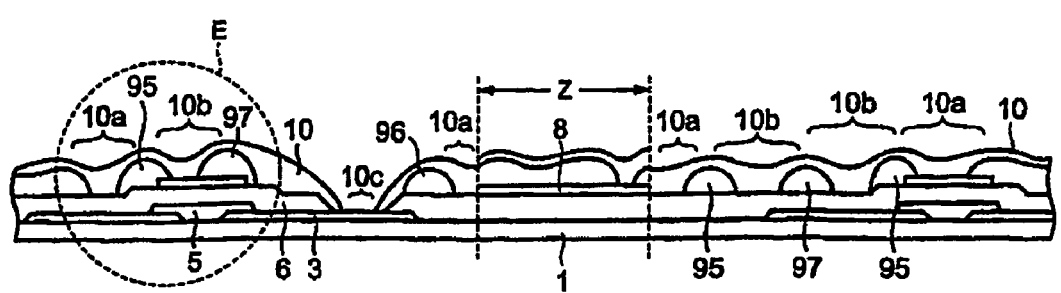
FIG. 12 is a cross-sectional view of the substrate on which the further photosensitive film 10 has been formed.
Figure 13:
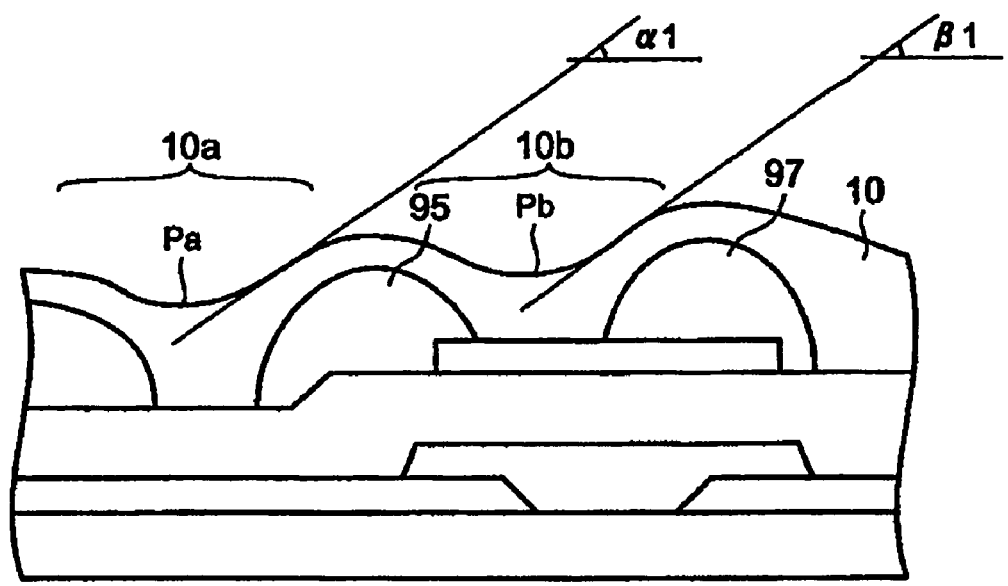
FIG. 13 is a enlarged view of a region E shown in FIG. 12.

FIG. 12 is a cross-sectional view of the substrate on which the further photosensitive film 10 has been formed. FIG. 13 is an enlarged view of a region E shown in FIG. 12.

The photosensitive film (which correspond to "second film" according to the invention) 10 is formed by applying and prebaking a photosensitive resin, exposing the prebaked photosensitive resin to light, and developing and postbaking it. The photosensitive film 10 comprises a window 10c for exposing a part of the drain electrode 3. Since the photosensitive film 9 formed below the photosensitive film 10 comprises the plurality of holes 92 and 93 (see FIG. 6), the surface of the photosensitive film 10 is influenced by the existence of the holes 92 and 93, so that recesses 10a and 10b are formed on the surface of the photosensitive film 10. By this recesses 10a and 10b, recesses and projections are formed on the surface of the photosensitive film 10. The combination of the photosensitive film 9 having the holes 91, 92, 93 and the photosensitive film 10 corresponds to "underlayer" according to the invention.

In this embodiment, the widths W of the partitions 95, 96 and 97 of the photosensitive film 9 formed below the photosensitive film 10 are set so as to be equal to each other. Therefore, as shown in FIG. 13, a maximum inclination angle $\alpha 1$ of the surface of the recess 10a and the maximum inclination angle $\beta 1$ of the surface of the recess 10b are substantially equal to each other. In this embodiment, $\alpha 1 = \beta 1 = 10$ degrees. Further, both an inclination angle at the lowermost point Pa of the recess 10a and an inclination angle at the lowermost point Pb are zero. Therefore, the range of the inclination angle $\alpha$ of the surface of the recess 10a is $0$ degree$<\alpha<10$ degrees and the range of the inclination angle $\beta$ of the surface of the recess 10b is also $0$ degree$<\beta<10$ degrees. That is to say, the range of the inclination angle $\alpha$ of the surface of the recess 10a is substantially same as the range of the inclination angle β of the surface of the recess 10b. After forming the photosensitive film 10, a conductive film is formed so as to cover the photosensitive film 10 (see FIG. 14).

Figure 14:
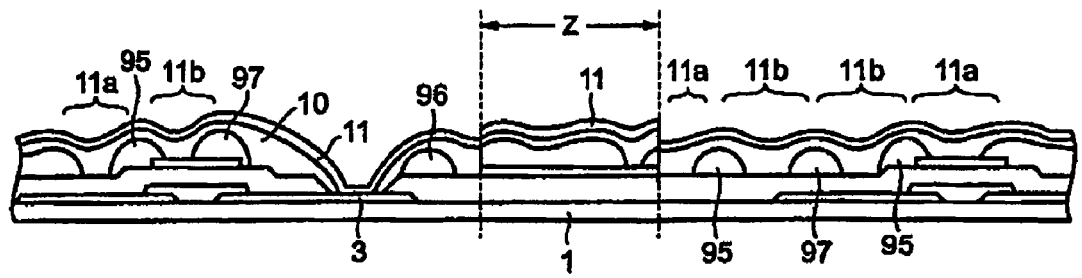
FIG. 14 is a cross-sectional view of the substrate after the conductive film 11 has been formed.

FIG. 14 is a cross-sectional view of the substrate after the conductive film 11 has been formed.

The conductive film 11 is required to have not only electric conductivity but also high reflectivity since the conductive film 11 is used as reflective electrodes 110 described later (see FIGS. 15 and 16). In this embodiment, in order that the conductive film 11 have not only electric conductivity but also high reflectivity, the conductive film 11 is constructed by multilayer (two-layer) film which consist of a Mo layer having mainly Mo (Molybdenum) and an Al layer having mainly Al (aluminum). Instead of the multilayer film having the Mo layer and the Al layer, a multilayer film having other materials may be used. Furthermore, the conductive film 11 may be a multilayer film having three or more layers, or a single Al film having mainly Al or a single Ag film having mainly Ag.

The conductive film 11 is connected to the drain electrode 3 since the window 10c (see FIG. 12) has been formed in the photosensitive film 10. Since the photosensitive film 10 has been formed below the conductive film 11, the conductive film 11 is influenced by the shape of the recesses 10a and 10b (see FIG. 12) of the photosensitive film 10 and is provided with recesses 11a and 11b having the inclination angle in the range from 0 degree to 10 degrees. After the conductive film 11 is thus formed, the photosensitive film 11 is separated into respective pixel regions by a lithographic step (see FIGS. 15 and 16).

Figure 15:
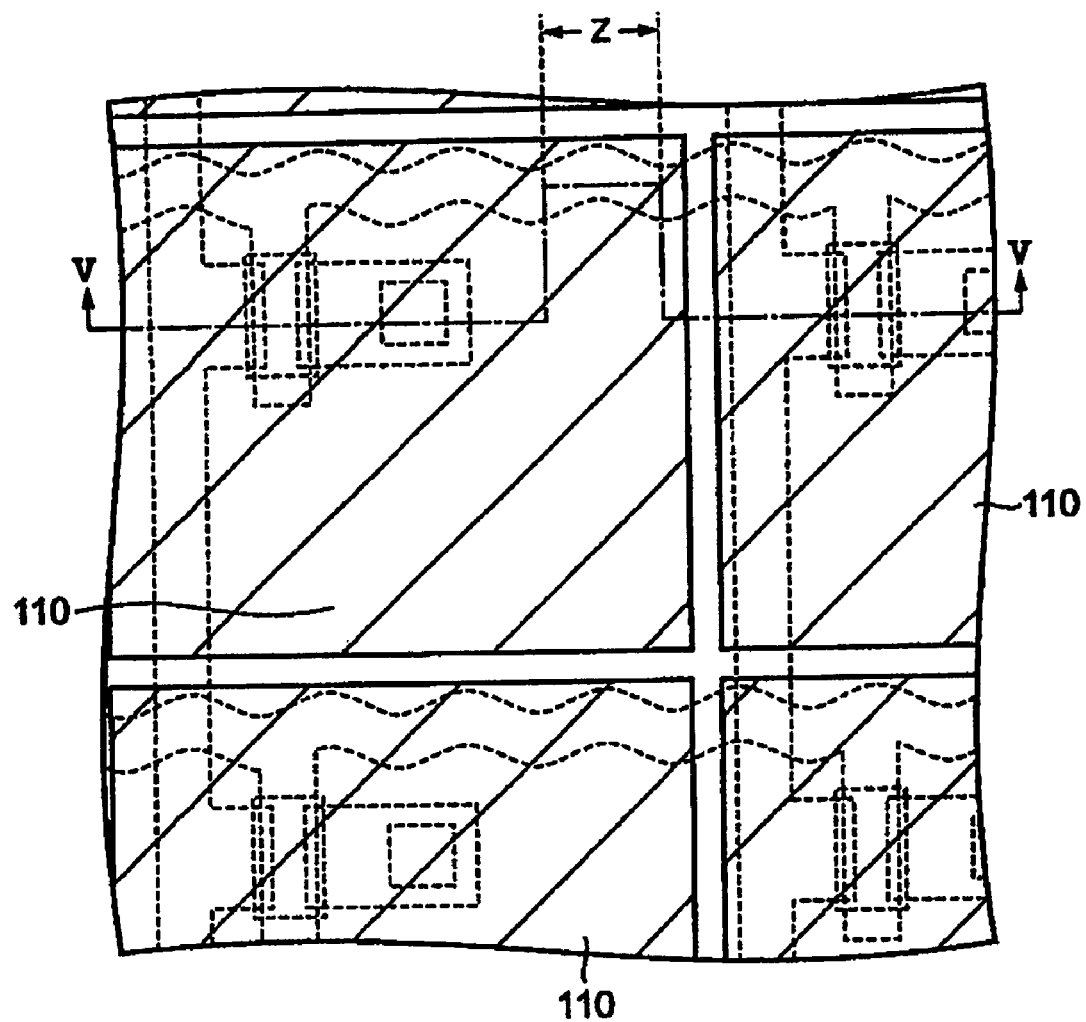
FIG. 15 is a plan view the substrate after the conductive film 11 has been separated into each pixel region.
Figure 16:
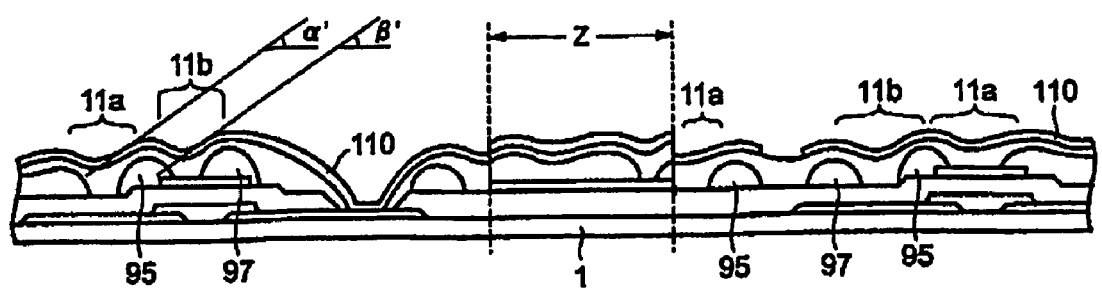
FIG. 16 is a cross-sectional view of the substrate taken along line V-V of FIG. 15.

FIG. 15 is a plan view the substrate after the conductive film 11 has been separated into respective pixel regions. FIG. 16 is a cross-sectional view of the substrate taken along line V-V of FIG. 15.

By separating the conductive film 11 into each pixel electrode, a rectangular reflective electrode 110 (shown by hatching) comprising recesses 11a and 11b is formed in each pixel region as shown in FIG. 15. In this way, the TFT substrate assembly 51 is manufactured. Since the reflective electrode 110 is formed so as to follow the shape of the recesses 10a and 10b of the photosensitive film 10, the inclination angle α' of the surface of the recess 11a of the reflective electrode 110 is 0 degree<α'<10 degrees and the inclination angle β' of the surface of the recess 11b of the reflective electrode 110 is 0 degree<β'<10 degrees. After the TFT substrate assembly 51 is manufactured, an alignment layer 12 is formed on the TFT substrate assembly 51 (see FIG. 1).

In this embodiment, as shown in FIGS. 5 to 10, the photosensitive film 9 is patterned in such a way that the partitions 95, 96 and 97 which are continuous in the form of mesh pattern and each has a substantially constant width W are formed. By providing the partitions 95, 96 and 97, the reflective characteristic of the liquid crystal display device 54 can be improved. In contrast, another method is considered in which the photosensitive film 9 is patterned in such a way that a plurality of projections separated from each other are formed (see FIGS. 17 to 19 described later) instead of the partitions 95, 96 and 97 which are continuous in the form of mesh pattern and each has a substantially constant width W, but it is difficult to improve the reflective characteristic in another method. Hereinafter, the difference between these reflective characteristics will be described with reference to FIGS. 17 to 20.

Figure 17:
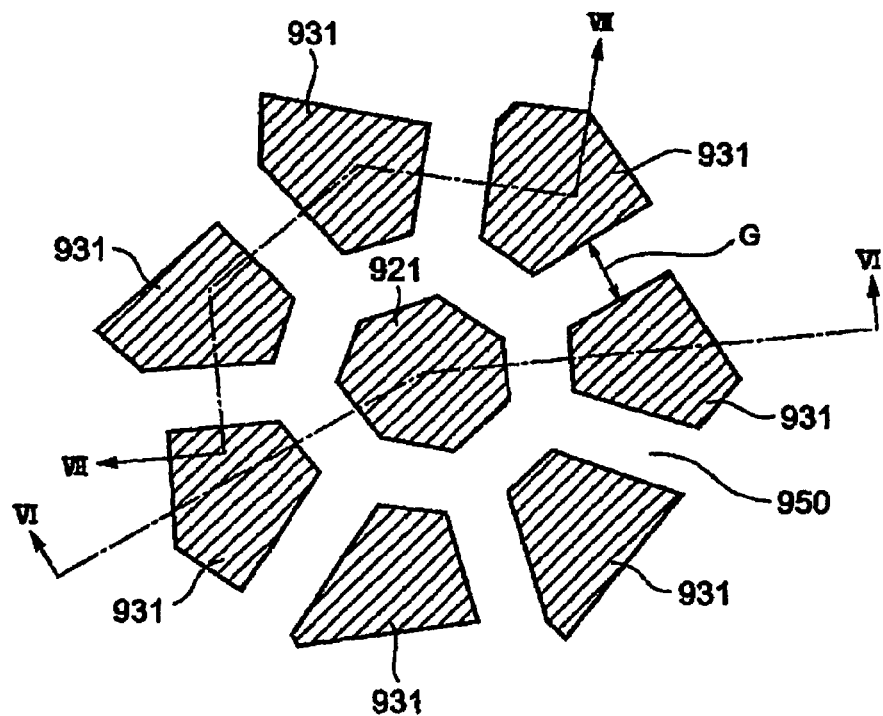
FIG. 17 is a plan view of the photosensitive film 9, which is one example, patterned so as to remain a large number of projections 921 and 931 instead of the partitions 95, 96 and 97.
Figure 18:
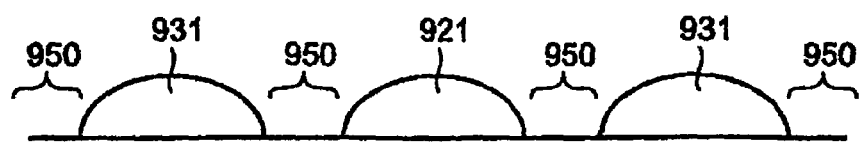
FIG. 18 is a cross-sectional view of the photosensitive film taken along the line VI-VI of FIG. 17.
Figure 19:
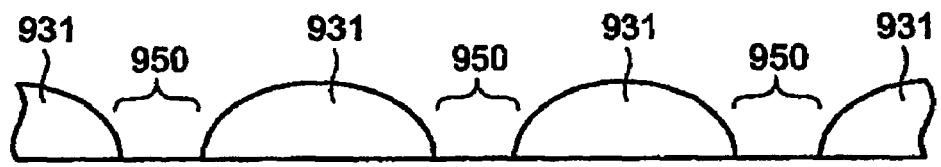
FIG. 19 is a cross-sectional view of the photosensitive film taken along the line VII-VII of FIG. 17.

FIG. 17 is a plan view of the photosensitive film 9, which is one example, patterned in such a way that a large number of projections 921 and 931 are formed instead of the partitions 95, 96 and 97. FIG. 18 is a cross-sectional view of the photosensitive film taken along the line VI-VI of FIG. 17. FIG. 19 is a cross-sectional view of the photosensitive film taken along the line VII-VII of FIG. 17.

In the previously described embodiment, the holes 92 and 93 (see FIG. 7) are formed in the photosensitive film 9 in order to form the partitions 95, 96 and 97 which are continuous in the mesh form and each has a substantially constant width W. However, in FIG. 17, grooves 950 which are continuous in a mesh form (shown by non-hatched region) are formed in the photosensitive film 9 in order to form projections 921 and 931 which are separated from each other (shown by hatching). That is to say, the parts of the photosensitive film 9 in FIG. 7 which have been removed (i.e. holes 92 and 93) correspond to the parts of the photosensitive film 9 in FIG. 17 which have remained (i.e. projections 921 and 931). The parts of the photosensitive film 9 in FIG. 7 which have remained (i.e. partitions 95 and 96) correspond to the parts of the photosensitive film 9 in FIG. 17 which have been removed (i.e. grooves 950). That is to say, there is an inverted relation between a pattern of the photosensitive film 9 in which the partitions 95, 96, 97 have been formed and a pattern of the photosensitive film 9 in which the projections 921, 931 have been formed. Therefore, a pattern of recesses and projections of the reflective electrode 110 changes inversely depending on whether the partitions 95, 96, 97 (see FIG. 7) or the projections 921, 931 (see FIG. 17) have been formed. If the pattern of the recesses and projections of the reflective electrode change inversely, the characteristic of the liquid crystal display devices changes accordingly as shown in FIG. 20.

Figure 20:
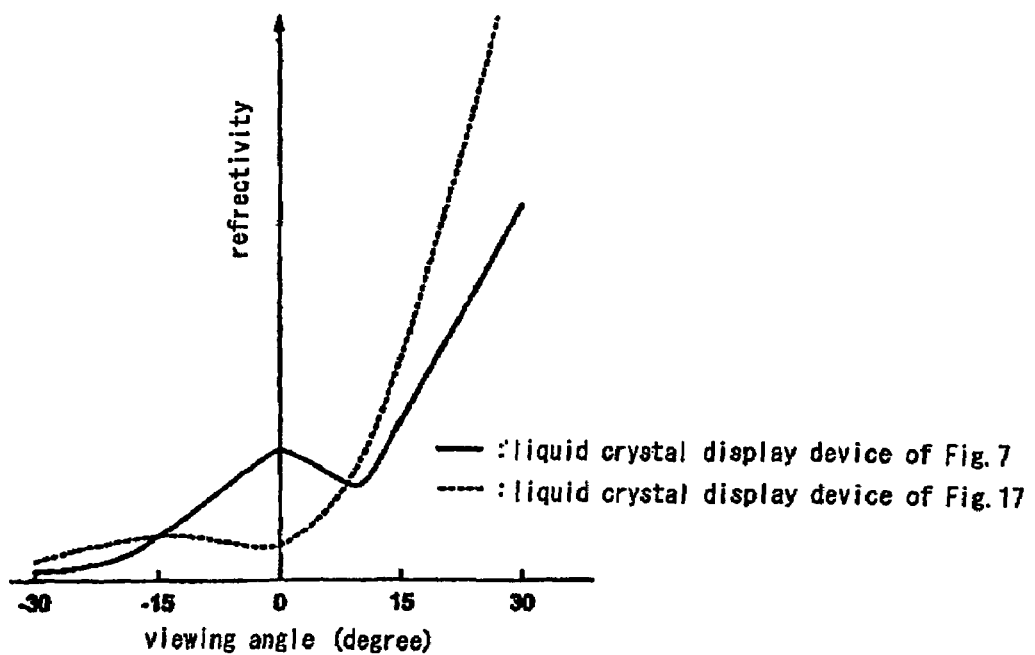
FIG. 20 is a graph showing a characteristic of liquid crystal display device provided with the partitions which are continuous in the mesh form and each has a substantially constant width W (see FIG. 7) and a characteristic of liquid crystal display device provided with the projections 921 and 931 which are separated from each other (see FIG. 17).
Figure 21:
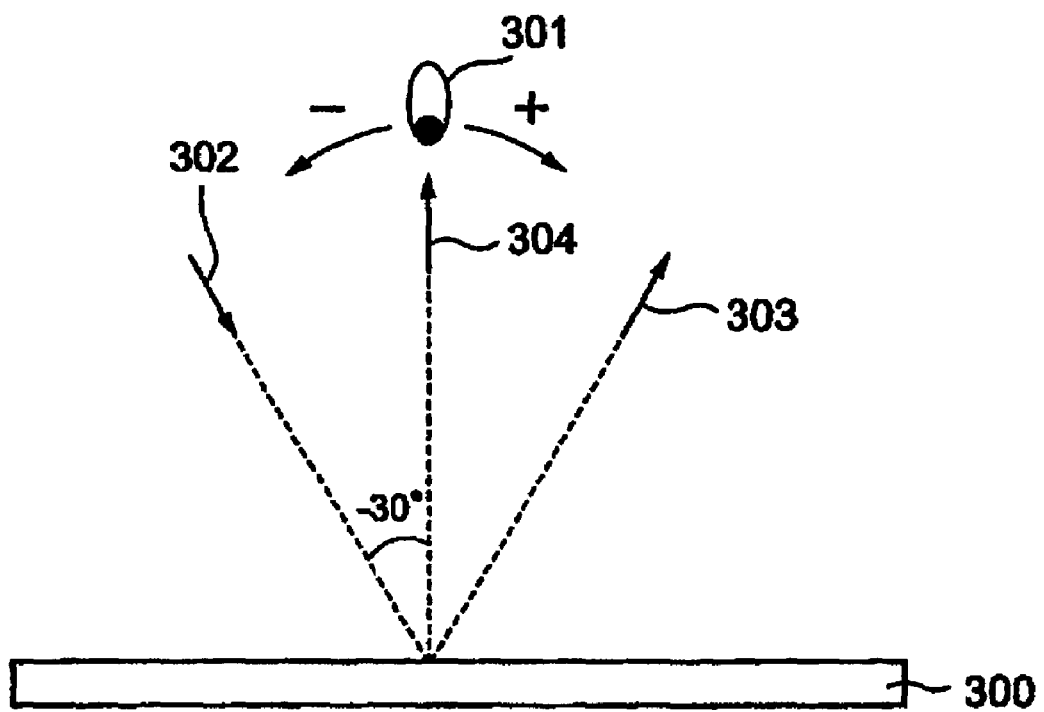
FIG. 21 is an illustration of measurement of the graph shown in FIG. 20.

FIG. 20 is a graph showing a reflective characteristic of liquid crystal display device provided with the partitions which are continuous in the mesh form and each has a substantially constant width W (see FIG. 7) and a reflective characteristic of liquid crystal display device provided with the projections 921 and 931 which are separated from each other (see FIG. 17). FIG. 21 is an illustration of a measurement for the graph shown in FIG. 20.

The graph of FIG. 20 shows a reflective characteristic in terms of viewing angles of user 301 who is viewing a liquid crystal panel 300 of a liquid crystal display device, when the exterior light 302 is incident on the liquid crystal panel 300 at an angle of −30 degrees. The horizontal axis of the graph is the viewing angle and the vertical axis is the reflectivity. A solid line shows a characteristic of the liquid crystal display device provided with the partitions 95, 96 and 97 (see FIGS. 7 and 10) which are continuous in the mesh form and each has a substantially constant width W (hereinafter, referred simply to as "liquid crystal display device of FIG. 7"). A broken line shows a reflective characteristic of the liquid crystal display device provided with the projections 921 and 931 (see FIG. 17) which are separated from each other (hereinafter, referred simply to as "liquid crystal display device of FIG. 17"). In the liquid crystal display device of FIG. 7, the width W of each of the partition 95, 96 and 97 is W=4.1 μm. In the liquid crystal display device of FIG. 17, a width G of the groove 950 is G=4.1 μm.

For improving the quality of image displayed by the liquid crystal display device, it is preferable that a reflectivity of the light 303 at the viewing angle of about 30 degrees (specular reflection component) is made small and the a reflectivity of the light 304 at the viewing angle of about 0 degree is made large. However, in the liquid crystal display device of FIG. 17, the reflectivity at the viewing angle of about 30 degrees (specular reflection component) is extremely large, so that it is difficult to improve the quality of image. In contrast, in the liquid crystal display device of FIG. 7, the reflectivity at the viewing angle of about 30 degrees (specular reflection component) decreases and the reflectivity at the viewing angle of about 0 degree increases, as compared with the liquid crystal display device of FIG. 17. Therefore, the quality of the image can be improved. The reason why the reflectivity at the viewing angle of about 30 degrees (specular reflection component) is decreased and the reflectivity at the viewing angle of about 0 degree is increased in the liquid crystal display device of FIG. 7, as compared with the liquid crystal display device of FIG. 17, can be considered as follows.

In the liquid crystal display device of FIG. 17, it is required to form the grooves 950 which are continuous in the mesh form in the photosensitive film 9 in order to provide the projections 921 and 931 which are separated from each other. Therefore, when a photosensitive resin which is a material of the photosensitive film 10 (see FIG. 12) is applied under the condition that the grooves 950 which are continuous in the mesh form have been formed, a part of the applied resin enters the grooves 950. The resin entered the grooves 950 spreads across all of the grooves 950 horizontally since the resin has fluidity. As a result, the portion of the photosensitive film 10 which has entered the grooves 950 is liable to have horizontal surface. If the photosensitive film 10 comprises the horizontal surface, the reflective electrode 110 can also have a horizontal surface since the reflective electrode 110 is influenced by the shape of the photosensitive film 10. Since the inclination angle of the portion of the reflective electrode 110 which has the horizontal surface is zero, light which is incident on the portion of the reflective electrode 110 having the horizontal surface is reflected in a specular reflection direction (i.e. a direction of the viewing angle of 30 degrees). For this reason, in the liquid crystal display device of FIG. 17, it is considered that the reflectivity at the viewing angle of about 30 degrees (specular reflection component) increase.

On the other hand, in the liquid crystal display device of FIG. 7, the large number of holes 92 and 93 which are separated from each other are formed in the photosensitive film 9 in order to form the partitions 95, 96 and 97 which are continuous in the mesh form and each has a substantially constant width W. Therefore, when a photosensitive resin which is a material of the photosensitive film 10 (see FIG. 12) is applied under the condition that the holes 92 and 93 which are separated from each other have been formed, a part of the applied resin enters each of the large number of holes 92 and 93. Since the large number of holes 92 and 93 are separated from each other, a resin entered one of the holes 92 or 93 can not move to the other holes 92 or 93. Therefore, it is not probable for the resin entered one of the holes 92 or 93 to spread horizontally. As a result, it is not probable that horizontal surfaces are formed in the reflective electrode, so that it is considered that the reflectivity at the viewing angle of about 30 degrees (specular reflection component) is decreased and the reflectivity at the viewing angle of about 0 degree is increased.

In the liquid crystal display device of FIG. 17, it is possible to decrease the reflectivity at the viewing angle of about 30 degrees (specular reflection component) to a certain extent by narrowing the width G of the grooves 950 (for example, to approximately 1 μm), but if the widths of the grooves must be set to approximately 1 μm, it is required that an exposure system with high resolution is prepared and the photosensitive film 9 is exposed to light using the high-resolution exposure system. A high-resolution exposure system is expensive, so that the equipment cost is high. In contrast, in this embodiment, since a value of the width W is approximately 4 μ/m and a value of the diameter D of inscribed circle Ci is approximately 5 μm (see FIG. 7), the widths W of the partitions 95, 96 and 97 can be kept at a constant value with high accuracy without the high-resolution exposure system, so that the equipment cost will be reduced.

In this embodiment, each of the partitions 95, 96 and 97 has a substantially constant width W. When the widths W of the partitions 95, 96 and 97 are set to a constant value, there is advantage that light reflected by the reflective electrode 110 can be used more efficiently as compared with an assumption case that each of partitions 95, 96 and 97 has a varying width instead of a constant width W. Hereinafter, the advantage will be described with reference to FIGS. 22 to 24 while comparing with the assumption case that each of partitions 95, 96 and 97 has a varying width.

Figure 22:
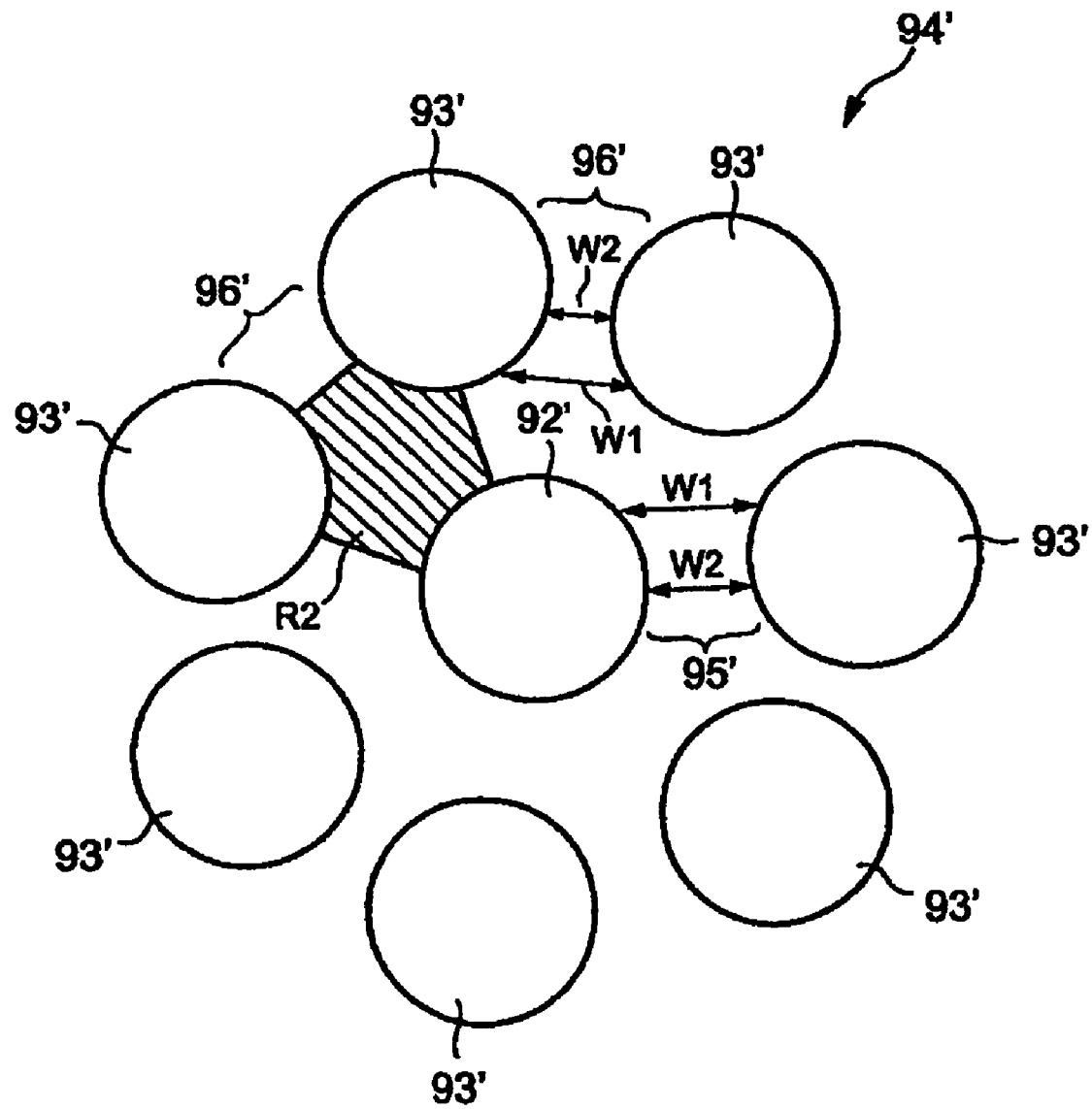
FIG. 22 is a plan view of partitions each having a varying width.
Figure 23:
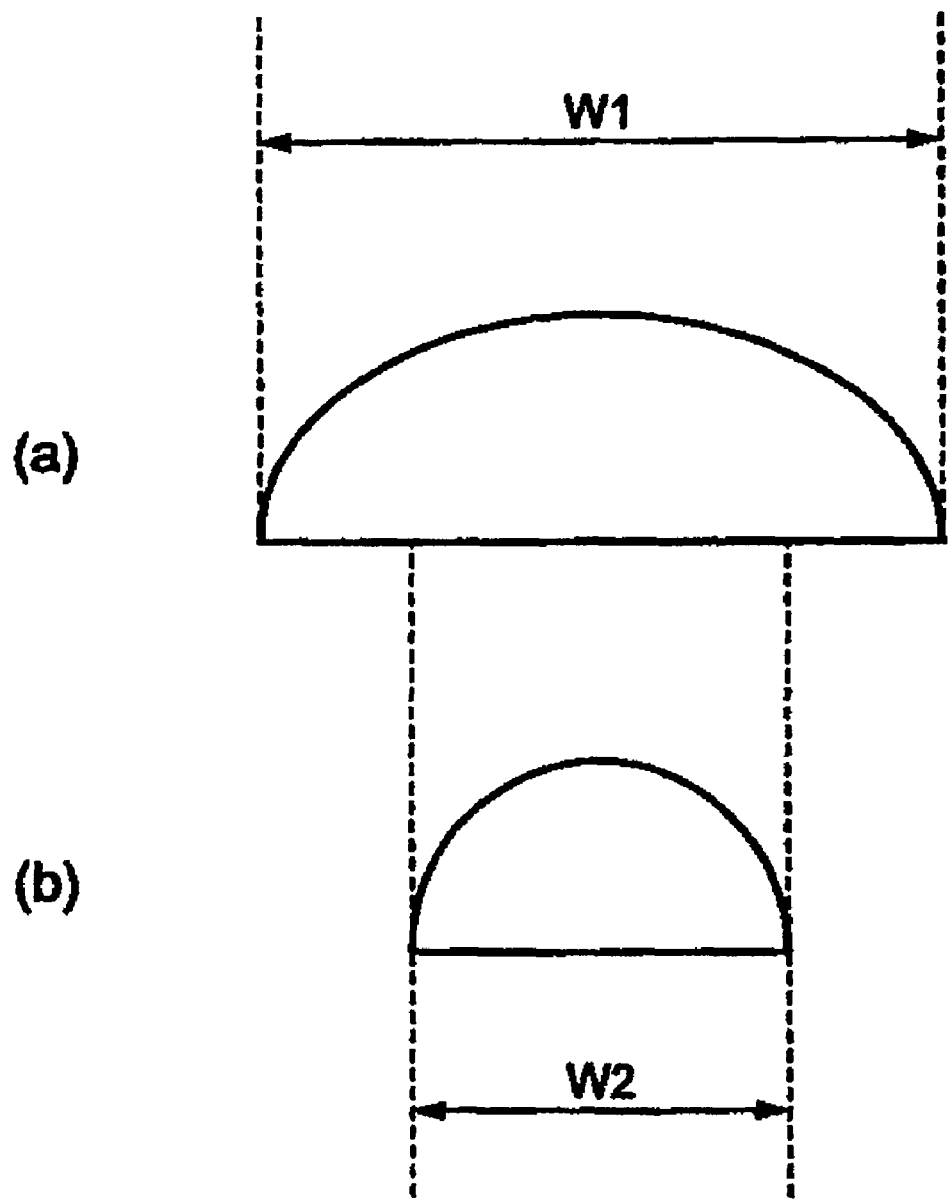
FIG. 23 shows a cross-sectional view (a) of a portion of a partition 95' shown in FIG. 22 having a width W1 and a cross-sectional view (b) of a portion of the partition 95' having a width W2, the views (a) and (b) being arranged vertically.

FIG. 22 is a plan view of partitions each having a varying width. FIG. 23 shows a cross-sectional view (a) of a portion of a partition 95' having a width W1 shown in FIG. 22 and a cross-sectional view (b) of a portion of the partition 95' having a width W2, the cross-sectional views (a) and (b) being arranged vertically.

Each of hole sets 94' shown in FIG. 22 comprises, one hole 92' and seven holes 93' arranged around the one hole 92' as in the case of FIG. 7. However, the shape of each of the holes 92' and 93' is substantially circle shape in contrast to FIG. 7. Therefore, if one of the partition 95' for separating the hole 92' from holes 93' is considered, a width W2 of the considered one partition 95' at a centre portion is different from a width W1 of the considered one partition 95' at a portion distant from the centre portion. That is to say, the width of the partition 95' varies depending on portions of the partition 95' (i.e. the partition 95' has a varying width). The width of the partition 96' also varies as in the case of the width of the partition 95'. It is noted that a width of a partition for separating adjacent hole sets 94', which is not shown in FIG. 22, also varies as in the case of the widths of the partitions 95' and 96'.

Referring to FIG. 23, it is recognized that since the width W1 of the partition 95' shown in the cross-sectional view (a) is larger than the width W2 shown in the cross-sectional view (b) an inclination in the cross-sectional view (a) is gentle but an inclination in the cross-sectional view (b) is steep. A reflective characteristic of a liquid crystal display device in which both a gentle inclination and a steep inclination are mixed in one partition (hereinafter, referred to as "liquid crystal display device of FIG. 22") is different from a reflective characteristic of the liquid crystal display device of FIG. 7 in which the partitions 95, 96 and 97 remains. Hereinafter, the difference of the reflective characteristics will be described.

Figure 24:
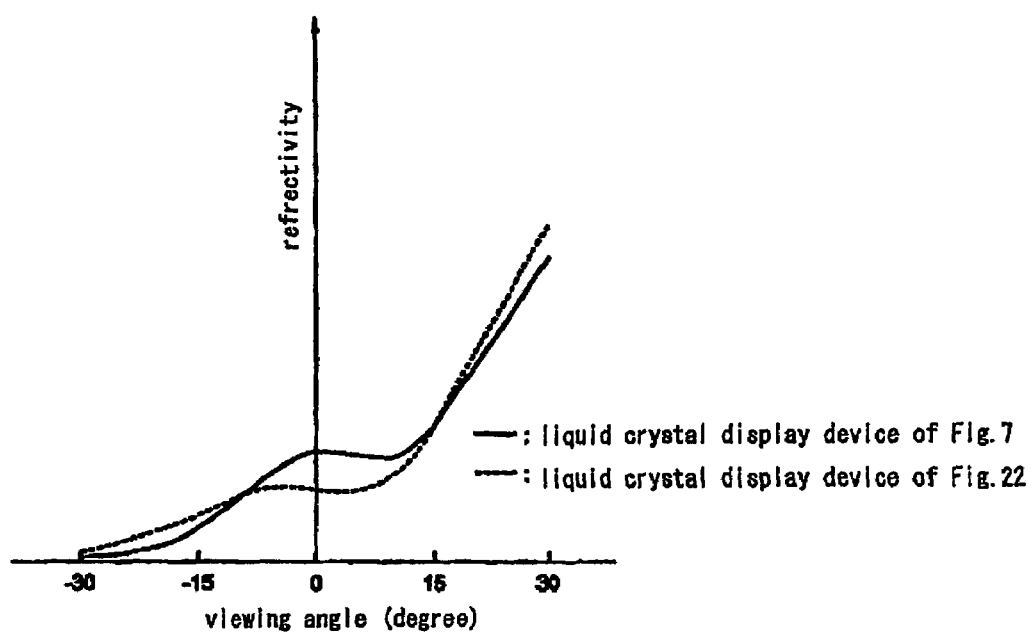
FIG. 24 is a graph showing a reflective characteristic of the liquid crystal display device of FIG. 7 and a reflective characteristic of the liquid crystal display device of FIG. 22.

FIG. 24 is a graph showing a reflective characteristic of the liquid crystal display device of FIG. 7 and a reflective characteristic of the liquid crystal display device of FIG. 22.

The graph shows a reflective characteristic when the exterior light 302 is incident on the liquid crystal panel at an angle of −30 degrees as in the case of FIG. 20. The horizontal axis of the graph is the viewing angle and the vertical axis is the reflectivity. A solid line shows a characteristic of the liquid crystal display device of FIG. 7 and a broken line shows a characteristic of the liquid crystal display device of FIG. 22. In the liquid crystal display device of FIG. 7, the width W of each of the partition 95, 96 and 97 is W=3.7 μm. In the liquid crystal display device of FIG. 22, the width W2 of the partition 95' at the centre portion is W2=3 μm and the width W2 of the partition 96' at the centre portion is W2=2 μm.

In the liquid crystal display device of FIG. 22, since one partition has both the gentle inclination and the steep inclination, a reflective electrode also has a gentle inclination and a steep inclination. If the both a gentle inclination and a steep inclination are mixed in the reflective electrode, a reflective direction of some of light reflected at the gentle inclination portion of the reflective electrode deviates from a reflective direction of some of light reflected at the steep inclination portion of the reflective electrode, so that it is difficult to reflect light in a desired direction efficiently. Further, since the holes 92' and 93' have circular shape, the width W1 of the partition 95' is larger than the width W2. Therefore, an area of a portion R2 (shown by hatching) surrounded by adjacent three holes 92' and 93' is liable to become larger than an area of a portion R1 (shown by hatching) surrounded by adjacent three holes 92 and 93 of FIG. 7. If the area of the portion R2 becomes large extremely, the portion R2 is liable to have a larger horizontal surface, so that the reflectivity at viewing angle of about 30 degrees (specular reflection component) increases and the quality of image is liable to be degraded. Therefore, the area of the portion R2 is required to be as small as possible. Then, in the liquid crystal display device of FIG. 22, for the purpose of making the area of the portion R2 as small as possible, the photosensitive film 9 is exposed to light and developed in such a way that the width W2 of the partition 96' at the centre portion has small value (in this example, approximately 2 μm). However, in the liquid crystal display device of FIG. 22, the width W2 of the partition 96' at the centre portion is required to be narrow to 2 μm extent, so that if the photosensitive film 9 is exposed to light using a exposure system with low resolution, the variations of the widths W2 of different partitions 96' are large. If trying to make the variations of the widths W2 of different partitions 96' small, it is required that the photosensitive film 9 is exposed to light using a high-resolution exposure system, but the equipment cost becomes high.

In contrast, in the liquid crystal display device of FIG. 7, the width of one partition is substantially constant without reference to the portions of this one partition, so that a range of the inclination angle of this one partition at a certain portion is substantially equal to a range of the inclination angle of this one partition at a portion distant from the certain portion. In addition, the widths of the different partitions are equal to each other, so that a range of the inclination angles of one partition is substantially equal to a range of the inclination angles of the other partition. Therefore, in the liquid crystal display device of FIG. 7, it is possible to reduce the variations (or deviation) of the reflection direction of light reflected by the reflective electrode 110 as compared with the liquid crystal display device of FIG. 22. As a result of this, by adjusting the width W of the partition, it is possible to reflect light in the desired direction efficiently. Further, in the liquid crystal display device of FIG. 7, since the width of one partition is substantially constant without reference to the portions of this one partition, it can be easy to make the area of portion R1 shown in FIG. 7 smaller than the area of portion R2 shown in FIG. 22. Therefore, the portion R1 is liable to have a smaller horizontal surface, so that it is possible to decrease the reflectivity at the viewing angle of about 30 degrees (specular reflection component) efficiently. From the graph shown in FIG. 24, it is recognized that, in the liquid crystal display device of FIG. 7, a reflectivity at the viewing angle from about −30 degrees to about −10 degrees and a reflectivity at the viewing angle from about 10 degrees to 30 degrees decreases, while a reflectivity at the viewing angle of about 0 degree increase. Therefore, the quality of image can be improved using the liquid crystal display device of FIG. 7. Further, the liquid crystal display device of FIG. 7 has an advantage that there is no need to use a high-resolution exposure system since the widths W of the partition 95, 96 and 97 is approximately 4 μm.

If variations of aperture areas of holes 92 and 93 formed in the photosensitive film 9 are large, variations of maximum inclination angles $\alpha 1$ and $\beta 1$ (see FIG. 13) are large accordingly, so that a reflective characteristic is liable to be degraded. Therefore, it is preferable that the variations of aperture areas of holes 92 and 93 formed in the photosensitive film 9 are as small as possible. In this embodiment, the variations of aperture areas are within 15%. When the variations of aperture areas is within 15%, values of maximum inclination angles $\alpha 1$ and $\beta 1$ are hardly subjected to an influence of the aperture areas, so that the maximum inclination angles $\alpha 1$ and $\beta 1$ can be set to a substantially equal value.

In this embodiment, the widths W of the partitions 95, 96 and 97 are set to approximately 4 μm. However, it is noted that the widths W of the partitions 95, 96 and 97 are not limited to approximately 4 μm, so that it is possible to improve the reflective characteristic even if the width W is larger or smaller than 4 μm. Especially, by setting the width W to 3 μm$\leqq$W$\leqq$6 μm, a good reflective characteristic can be obtained.

Further, in this embodiment, in order to provide the photosensitive film 9 with the partitions 95, 96 and 97 each having substantially constant width W, the holes 92 and 93 are formed in accordance with the rule which is described with reference to FIGS. 7 to 10. However, in the invention, it is noted that if it is achieved that the partitions between the adjacent hole have widths substantially equal to each other, the rule described above may be changed within a scope which does not depart from an object of the invention. For example, if it is achieved that the partitions between the adjacent holes have widths substantially equal to each other, the holes formed in the photosensitive film 9 may be arranged at random.

In this embodiment, each of the partitions 95, 96 and 97 has a constant width W. However, it is noted that the widths of some partitions of the partitions 95, 96 and 97 may have a varying width as shown in FIG. 22 if the object of the invention can be achieved.

In this embodiment, all of the partitions 95, 96 and 97 have widths W which are substantially equal to each other. However, it is noted that the widths of some partitions of the partitions 95, 96 and 97 may be different from the widths of the other partitions of the partitions 95, 96 and 97 if the object of the invention can be achieved.

The reflective electrode 110 formed in this embodiment has a role as not only a reflector for reflecting a light but also a pixel electrode. However, it is noted that the invention may be also applied to a method of manufacturing a reflector which dose not act as an electrode such as pixel electrode but is used only for reflecting a light, instead of a method of manufacturing the reflective electrode 110.

As described above, the invention provides a method of forming a reflector member which contributes to an improvement of the quality of the image, and a reflective structure and a liquid crystal display device to which the method is applied.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of forming a reflector member comprising a step of forming an underlayer and a step of forming said reflector member on said underlayer, wherein said step of forming said underlayer comprises the steps of:
   forming a first film;
   forming a plurality of polygonal shaped holes having a plurality of edges in said first film; and
   forming a second film on said first film in which said plurality holes have been formed, wherein said step of forming the plurality of holes is a step of forming said plurality of holes in said first film in such a way that a plurality of partitions are formed in said first film, each of said plurality of partitions having a substantially constant width and separating adjacent holes of said plurality of holes;

wherein said widths of at least several of said plurality of partitions are substantially equal to each other;

wherein, in said step of forming a plurality of holes, said plurality of holes are formed in said first film in such a way that a plurality of hole sets are formed in said first film;

wherein each of said hole sets comprises only one first hole and only seven second holes of said plurality of holes;

wherein said only seven second holes are arranged around said only one first hole; and wherein each edge of said first hole facing a corresponding edge of one of said second holes defines one of said plurality of partitions.

2. The method of forming a reflector member as claimed in claim 1, wherein said widths of said at least several of said plurality of partitions are in a range from 3 μm to 6 μm inclusive.

3. The method of forming a reflector member as claimed in claim 1, wherein said step of forming said first film is a step of forming a photosensitive film, and that said step of forming said plurality of holes is a step of patterning said photosensitive film in such a way that said plurality of partitions are formed in said photosensitive film, each of said plurality of holes having a substantially constant width and separating adjacent holes of said plurality of holes, wherein said widths of at least several of said plurality of partitions are substantially equal to each other;

wherein, in said step of forming a plurality of holes, said plurality of holes are formed in said first film in such a way that a plurality of hole sets are formed in said first film; and wherein each of said hole sets comprises only one first hole and only seven second holes of said plurality of holes, and wherein said only seven second holes are arranged around said only one first hole.

4. A reflective structure comprising a plurality of reflector members and an underlayer for providing said reflector members with predetermined forms, wherein said underlayer comprises a first film having a plurality of polygonal shaped holes having a plurality of edges and a second film formed on said first film, in that at least a portion of each of at least several of said plurality of holes is filled with a material of said second film, in that said first film comprises a plurality of partitions, each of said plurality of partitions having a substantially constant width and separating a pair of adjacent holes of said plurality of holes, and in that said widths of at least several of said plurality of partitions are substantially equal to each other;

wherein said plurality of holes are formed in said first film in such a way that a plurality of hole sets are formed in said first film;

wherein each of said hole sets comprises only one first hole and only seven second holes of said plurality of holes;

wherein said only seven second holes are arranged around said only one first hole; and wherein each edge of said first hole facing a corresponding edge of one of said second holes defines one of said plurality of partitions.

5. The reflective structure as claimed in claim 4, wherein said widths of said at least several of said plurality of partitions are in the range from 3 μm to 6 μm inclusive.

6. The reflective structure as claimed in claim 4, wherein said first and second films are formed from a photosensitive resin.

7. A liquid crystal display device provided with said reflective structure described in claim 4.

* * * * *